(12) United States Patent
Chu et al.

(10) Patent No.: US 12,405,691 B2
(45) Date of Patent: Sep. 2, 2025

(54) SYSTEMS AND METHODS TO MITIGATE FALSE TOUCHPAD BUTTON EVENTS

(71) Applicant: Dell Products, L.P., Round Rock, TX (US)

(72) Inventors: Tao-Peng Chu, Taipei (TW); Chen Hsin Chang, Keelung (TW); Yi-Chung Chu, New Taipei (TW); Shao-Hung Yu, New Taipei (TW)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 18/314,236

(22) Filed: May 9, 2023

(65) Prior Publication Data

US 2024/0377905 A1    Nov. 14, 2024

(51) Int. Cl.
*G06F 3/041* (2006.01)
*G06F 3/0354* (2013.01)
*G06F 3/038* (2013.01)

(52) U.S. Cl.
CPC ........ *G06F 3/0418* (2013.01); *G06F 3/03547* (2013.01); *G06F 3/038* (2013.01)

(58) Field of Classification Search
CPC .................................................... G06F 3/038
See application file for complete search history.

(56) References Cited

U.S. PATENT DOCUMENTS 11,868,534 B1 * 1/2024 Michaelis ............... G06F 3/016
2022/0147222 A1 * 5/2022 Chen ................... G06F 3/04186

* cited by examiner

*Primary Examiner* — Gustavo Polo
(74) *Attorney, Agent, or Firm* — Fogarty LLP

(57) ABSTRACT

Embodiments of the present disclosure provide systems and methods to prevent false triggering of the touchpad buttons associated with a touchpad. The false touchpad button mitigation system and method uses executable logic that upon detection of a button press event, determines whether touchpad data is currently being received from the touchpad, and when no touchpad data is currently being received, inhibit the button press event from being processed by an Information Handling System (HIS). Touchpad data refers to data generated by a touchpad when a user's finger is touching the touchpad. Thus, if the user is not actively touching the touchpad, the false button press event may be blocked by the executable logic.

20 Claims, 6 Drawing Sheets

SYSTEMS AND METHODS TO MITIGATE FALSE TOUCHPAD BUTTON EVENTS

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

The technology associated with portable computing devices is increasing such that they can provide ever-increasing levels of functionality within a limited size. Such portable computing devices may include, for example, laptop computing devices, cell phones, Personal Digital Assistants (PDAs), tablets, remote control devices, portable media players, and the like. Although each portable computing device have heretofore employed a specific function for users, enhancement in technology has enabled these portable computing devices to provide overlapping functionality in order to appeal to consumer needs. For example, currently available laptop computing devices can provide services, such as cellular service in addition to their traditional role of providing computing services for their users. One particular enhancement in technology that has allowed such increased functionality has involved the use of touchpads for inputting user information. With the increasingly popularity of touchpads configured on laptop computers, users have been exposed to a new level of touch experience. With the increased exposure to touchpads, users expect more of the touch experience and portability provided by touchpads. As such, portable computing device vendors have been encouraged to develop products that provide the touch experience while continually making those devices smaller and more portable.

SUMMARY

In various embodiments, Information Handling Systems (IHSs) may include: a touchpad configured to generate touchpad data for manipulating the operation of the IHS; one or more buttons associated with the touchpad; and at least one memory coupled to at least one processor, the at least one memory having program instructions stored thereon that, upon execution by the at least one processor, cause the instructions to: when a button press event of one of the buttons occurs, determine whether the touchpad data is currently being received from the touchpad; and when no touchpad data is currently being received, inhibit the button press event from being processed by the IHS.

In some embodiments, the program instructions, upon execution, further cause IHS to, when touchpad data is currently being received, allow the button press event to be processed by the IHS. In some embodiments, the touchpad is configured on a portable computing device comprising at least one of a laptop computing device, a cell phone, a Personal Digital Assistant (PDA), a tablet, a remote control device, and a portable media player. In some embodiments, the portable computing device comprises a housing that is susceptible to causing a false button press event due to flexure of the housing. In some embodiments, the buttons are configured underneath the touchpad. In some embodiments, the buttons comprise mechanical buttons. In some embodiments, the program instructions are performed on a discrete integrated circuit (IC) component. In some embodiments, the program instructions, upon execution, further cause IHS to communicate with the touchpad using an I2C protocol. In some embodiments, the program instructions, upon execution, further cause IHS to, following conclusion of the touchpad data, wait a specified amount of time prior to inhibiting the button press event from being processed by the IHS. In some embodiments, the buttons are configured external to the touchpad.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Portable computing devices may be included with a touchpad that allows their users to manipulate the operation of the portable computing device. The touchpad, which may also be referred to as a trackpad, generally includes a surface that enables user input via a tactile sensor that senses a user's finger movement and manipulates the portable computing device, such as by moving a cursor over a display screen based upon the user's finger movements. A touchpad may be particularly useful when implemented in conjunction with a laptop computer where its alternative pointing device, namely a mouse, would not provide a suitable replacement in environments where space is scarce. Similar to the mouse, the touchpad may be implemented with one or more buttons that allow the user to further manipulate the operation of the portable computing device. For example, one button may be operable to receive user input for selecting a particular item on the display once the touchpad has been used to move a cursor or pointer over the displayed item. Example portable computing devices in which touchpads may be implemented may include, but are not limited to laptop computing devices, cell phones, Personal Digital Assistants (PDAs), tablets, remote control devices, portable media players, and the like.

Vendors of portable computing devices, such as laptop computers, have been increasingly encouraged to make portable computing devices smaller and lighter, while yet providing enhanced performance. Since a housing often contributes substantially to the overall size and weight of a portable computing device, efforts have been made to reduce its size and thickness to accommodate for customer demands of smaller size and less weight. The size of the touchpad has also gradually increased in order to improve user experience. Nevertheless, newer portable computing device designs have created a problem in which the housing often flexes to a degree in which the buttons associated with the touchpad may be falsely triggered due to excessive flexure of the housing relative to the internal components of the portable computing device.

Figure 1A:
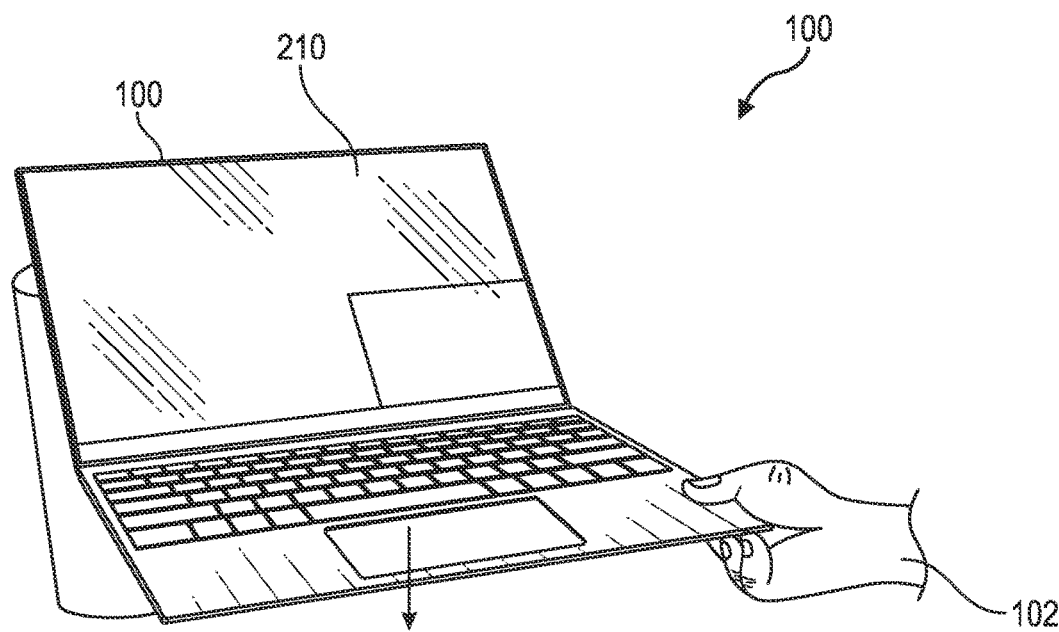
FIGS. 1A and 1B illustrates how physical strain, when placed on a portable computing device, may cause a false button press event according to one embodiment of the present disclosure.
Figure 1B:
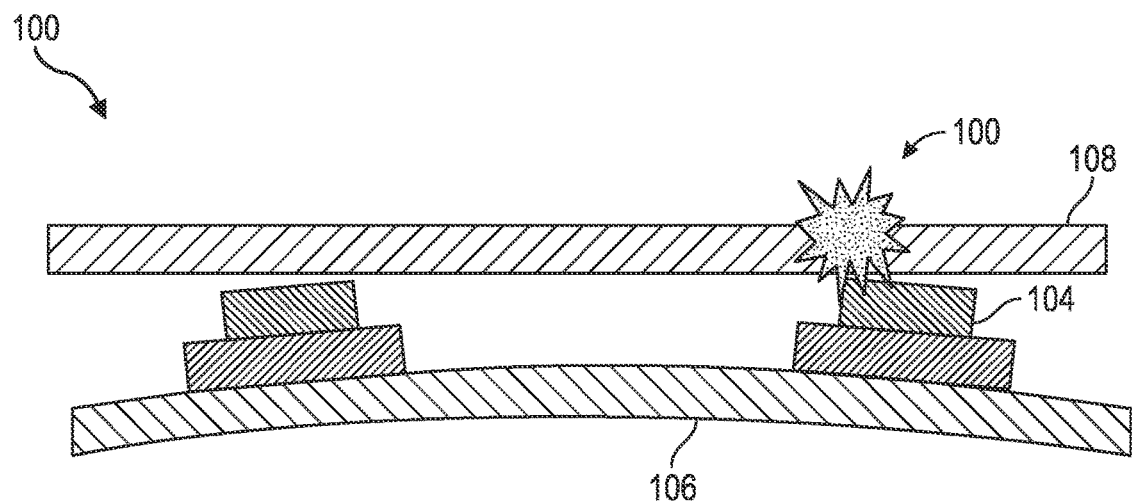

FIGS. 1A and 1B, for example, show how physical strain, when placed on a laptop computer 100, may cause a false button press event (e.g., false triggering event) according to one embodiment of the present disclosure. In this particular example, a user's hand 102 is supporting the weight of the laptop computer 100 from its right, front edge as shown in FIG. 1A. FIG. 1B illustrates a partial, enlarged, profile view of the touchpad buttons 104 when the laptop computer 100 is supported by the user's hand 102 as shown in FIG. 1A. As shown, a housing 106 of the laptop computer 100 flexes due to the physical strain imparted by the user's hand 102 to a degree in which one of the buttons 104 contacts a touchpad 108 or another internal component of the laptop computer 100, thus causing a false button press event.

Conventional techniques to solve such a problem have included the use of spacers (e.g., rubber pads) configured between the housing and the internal components of a laptop computer, which causes the spacing between the housing and those internal components to remain relatively constant. This technique, however, causes the strain of the housing to be imparted on the internal components. Additionally, the dimensional tolerances required with such a technique may be difficult to maintain, particularly, when those internal components may be replaced with other internal components during the serviceable life of the laptop computer. Another conventional technique involving use of a relatively more rigid material, such as including a magnesium-aluminum (Mg—Al) layer on the housing has been tried. This technique, however, necessarily adds size, cost and weight to the laptop computer, and thus regresses from the overall intent of reducing the laptop computer's size and weight.

As will be described in detail herein below, embodiments of the present disclosure provide a system and method to prevent false triggering of the touchpad buttons associated with a touchpad. The false touchpad button mitigation system and method uses executable logic that upon detection of a button press event, determines whether the touchpad data is currently being received from the touchpad, and when no touchpad data is currently being received, inhibit the button press event from being processed by the IHS. Touchpad data generally refers to data generated by a touchpad when a user's finger is touching the touchpad. Thus, if the user is not actively touching the touchpad, the false button press event may be blocked by the executable logic. Additional embodiments of the false touchpad button triggering system and method will be described in detail herein below.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 2:
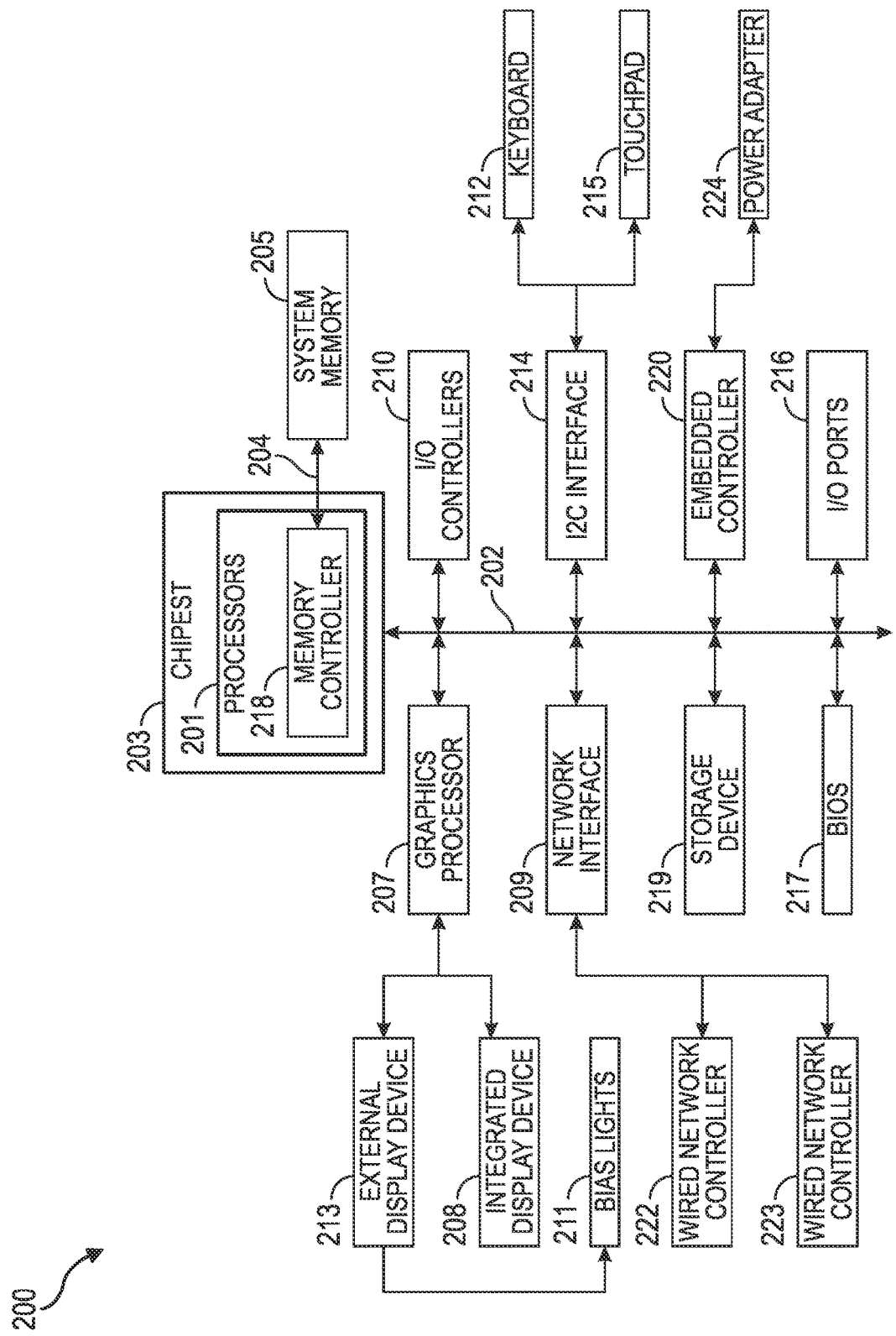
FIG. 2 is a block diagram illustrating certain components of an IHS configured according to certain embodiments for use with systems and methods to prevent false triggering of the touchpad buttons associated with a touchpad.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 2 shows an example of an IHS configured to implement the systems and methods described herein according to certain embodiments. It should be appreciated that although certain IHS embodiments described herein may be discussed in the context of a portable computing device utilizing an external display, other embodiments may be utilized.

FIG. 2 is a block diagram illustrating certain components of an IHS 200 configured according to certain embodiments for use with systems and methods to prevent false triggering of the touchpad buttons associated with a touchpad. For example, HIS 200 may comprise at least part of the laptop computer 100 described above with reference to FIG. 1. While a single IHS 200 is illustrated in FIG. 2, IHS 200 may be a component of an enterprise system that may include any number of additional IHSs that may also be configured in the same or similar manner to IHS 200. IHS 200 includes one or more processors 201, such as a Central Processing Unit (CPU), that execute code retrieved from a system memory 205. Although IHS 200 is illustrated with a single processor 201, other embodiments may include two or more processors, that may each be configured identically, or to provide specialized processing functions. Processor 201 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 2, the processor 201 includes an integrated memory controller 218 that may be implemented directly within the circuitry of the processor 201, or the memory controller 218 may be a separate integrated circuit that is located on the same die as the processor 201. The memory controller 218 may be configured to manage the transfer of data to and from the system memory 205 of the IHS 200 via a high-speed memory interface 204.

The system memory 205 that is coupled to processor 201 provides the processor 201 with a high-speed memory that may be used in the execution of computer program instructions by the processor 201. Accordingly, system memory 205 may include memory components, such as such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, the system memory 205 may be comprised of multiple removable memory modules.

IHS 200 utilizes a chipset 203 that may include one or more integrated circuits that are connect to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides the processor(s) 201 with access to a variety of resources accessible via bus 202. In IHS 200, bus 202 is illustrated as a single element. Various embodiments may utilize any number of buses to provide the illustrated pathways served by bus 202.

As illustrated, a variety of resources may be coupled to the processor(s) 201 of the IHS 200 through the chipset 203. For instance, chipset 203 may be coupled to a network interface 209 that may support different types of network connectivity. In certain embodiments, IHS 200 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 209 may support network connections by wired network controllers 222 and wireless network controllers 223. Each network controller 222, 223 may be coupled via various buses to the chipset 203 of IHS 200 in supporting different types of network connectivity, such as the network connectivity utilized in the operation of applications of the operating system of IHS 200.

Chipset 203 may also provide access to one or more display device(s) 208, 213 via graphics processor 207. In certain embodiments, graphics processor 207 may be comprised within a video or graphics card or within an embedded controller installed within IHS 200. In certain embodiments, graphics processor 207 may be integrated within processor 201, such as a component of a system-on-chip. Graphics processor 207 may generate display information and provide the generated information to one or more display device(s) 208, 213 coupled to the IHS 200. The one or more display devices 208, 213 coupled to IHS 200 may utilize LCD, LED, OLED, or other display technologies.

Each display device 208, 213 may be capable of receiving touch inputs such as via a touch controller that may be an embedded component of the display device 208, 213 or via capabilities of graphics processor 207, or via a separate microcontroller of IHS 200 that is accessed via bus 202. In some embodiments, IHS 200 may support an integrated display device 208, such as a display integrated into a laptop, tablet, 2-in-1 convertible device, or mobile device.

In various embodiments, IHS 200 may include one or more I/O ports 216 that may support removable couplings with various types of external devices and systems, including removable couplings with peripheral devices that may be configured for operation by a particular user of IHS 200. For instance, I/O 216 ports may include USB (Universal Serial Bus) ports, by which a variety of external devices may be coupled to IHS 200. In addition to or instead of USB ports, I/O ports 216 may include various types of physical I/O ports that are accessible to a user via the enclosure of the IHS 200. In certain embodiments, chipset 203 may additionally utilize one or more I/O controllers 210 that may each support the operation of hardware components such as user I/O devices that are physically coupled to an I/O port 216 and/or peripheral components that are wirelessly coupled to IHS 200 via a network interface 209. In various embodiments, I/O controller 210 may support the operation of one or more user I/O devices such as a keyboard, mouse, touchpad, touchscreen, microphone, speakers, camera and other input and output devices that may be coupled to IHS 200.

Certain IHS 200 embodiments may utilize an I2C interface 214. In certain embodiments, I2C interface 214 may be an independent microcontroller or other logic unit that is coupled to the motherboard of IHS 200. In certain embodiments, I2C interface 214 may be a component of an integrated system-on-chip incorporated into processor 201 In some embodiments, I2C interface 214 may communicate with chipset 203 of processor 201 via a bus connection such as an Inter-Integrated Circuit (I2C) bus or other suitable type of bus connection. I2C interface 214 may also utilize an I2C bus for communicating with various sensors supported by IHS 200. I2C interface 214 may be configured to receive input from, and control the operation of a keyboard 212 and a touchpad 215.

IHS 200 embodiments may also utilize an embedded controller 220 that may be a motherboard component of IHS 200 and may include one or more logic units. In certain embodiments, embedded controller 220 may operate from a separate power plane from the main processors 201 and thus the operating system functions of IHS 200. Embedded controller 220 may implement operations for interfacing with a power adapter 224 in managing power for IHS 200. Such operations may be utilized to determine the power status of IHS 200, such as whether IHS 200 is operating from battery power or is plugged into an AC power source. Firmware instructions utilized by embedded controller 220 may be used to operate a secure execution environment that may include operations for providing various core functions of IHS 200, such as power management, management of operating modes in which IHS 200 may be physically configured and support for certain integrated I/O functions. As described, IHS 200 may utilize an external display 213 that supports bias lighting 211 output via an adjustable halo. In certain embodiments, the operations of the secure execution environment of embedded controller 220 may include operations for interfacing with sensors that providing the current position in which a bias lighting baffle of an external display, such as the halo described with regard to FIGS. 3A-C, has been adjusted.

Chipset 203 also provides processor 201 with access to one or more storage devices 219. In various embodiments, storage device 219 may be integral to the IHS 200, or may be external to the IHS 200. In certain embodiments, storage device 219 may be accessed via a storage controller that may be an integrated component of the storage device. Storage device 219 may be implemented using any memory technology allowing IHS 200 to store and retrieve data. For instance, storage device 219 may be a magnetic hard disk storage drive or a solid-state storage drive. In certain embodiments, storage device 219 may be a system of storage devices, such as a cloud drive accessible via network interface 209.

In certain embodiments, IHS 200 may utilize a BIOS (Basic Input/Output System) 217 that may be stored in a non-volatile memory accessible by chipset 203 via bus 202. Upon powering or restarting IHS 200, processor(s) 201 may utilize BIOS instructions to initialize and test hardware components coupled to the IHS 200. The BIOS instructions may also load an operating system for use by the IHS 200. The BIOS 217 provides an abstraction layer that allows the operating system to interface with the hardware components of the IHS 200. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as a systems-on-a-chip.

Figure 3:
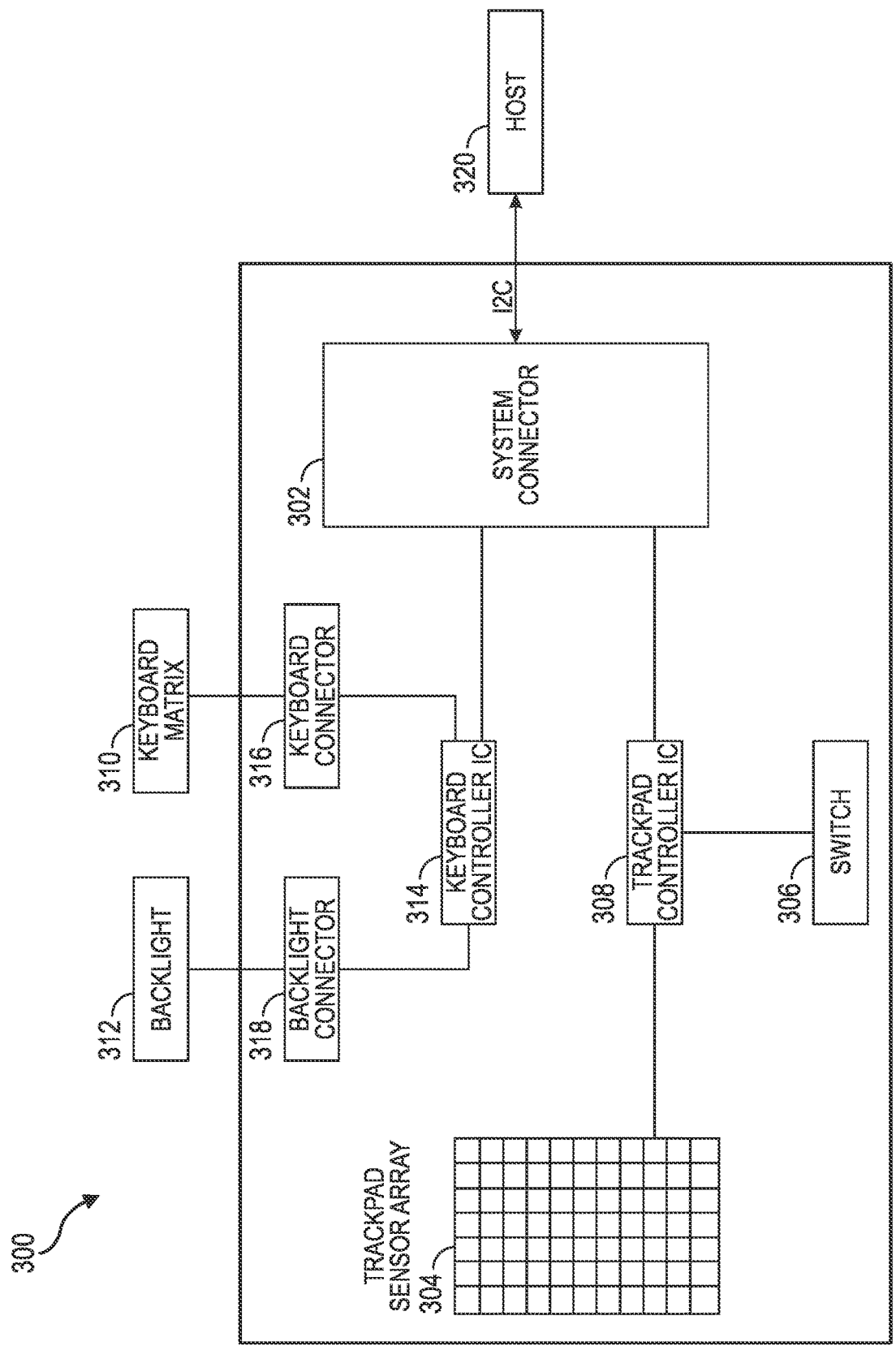
FIG. 3 illustrates several components of an example false touchpad button event mitigation system according to one embodiment of the present disclosure.

FIG. 3 illustrates several components of an example false touchpad button event mitigation system 300 according to one embodiment of the present disclosure. The false touchpad button event mitigation system 300 includes an i2c interface 302 that provides communication between host Operating System (OS) 320 of the laptop computer 100 and a touchpad 304 and one or more touchpad buttons 306 via a touchpad controller 308. The i2c interface 302 may also provide communication between the host OS 320 and a keyboard 310 and a keyboard backlight 312 via a keyboard controller 314. Additionally, the keyboard 310 and keyboard backlight 312 may be coupled to the keyboard controller 314 via a keyboard connector 316 and a backlight connector 318, respectively.

As shown, the touchpad controller 308 communicates with the host OS 320 using an i2c protocol. Nevertheless, it should be appreciated that the touchpad controller 308 may communicate with the host OS 320 using any suitable protocol that allows the host OS 320 to receive and process touchpad data and button press events obtained from the touchpad 304 and touchpad buttons 306, respectively. In one embodiment, the touchpad controller 308 is implemented as a discrete integrated circuit (IC) component. Implementation of the touchpad controller 308 as a discrete component may enable embodiments of the false touchpad button event mitigation system 300 to process touchpad data and button press events in an efficient and secure manner. In another embodiment, the buttons are mechanical buttons that either present a high resistance when not activated and a low resistance when activated to the touchpad controller 308. Many users still prefer the tactile feel of mechanical keys. Mechanical buttons may be beneficial due to their relatively low cost. Additionally, mechanical buttons do not unnecessarily consume any processing load as would be experienced with software-based buttons often implemented in device drivers that interpret certain finger actions to be button activation actions.

According to embodiments of the present disclosure, the false touchpad button event mitigation 300 may include executable logic for determining whether the touchpad data is currently being received from the touchpad 304 when a button press event of one of the touchpad buttons 306 occurs, and when no touchpad data is currently being received, inhibit the button press event from being processed by the host OS 320.

In one embodiment, the touchpad buttons 306 may be physically configured underneath the touchpad 304 when the portable computing device is in a normal position in which the feet of the portable computing device are supported over a relatively flat surface, such as a desk. When configured underneath the touchpad 304, a proper (e.g., non-false) button press event necessarily involves touchpad data being generated when the button press event occurs. That is, if the touchpad controller 308 receives a button press event when no touchpad data is being received, it may determine that a false button press event has occurred and inhibit the false button press event from being processed by the host OS 320. In one embodiment, the touchpad controller 308 may inhibit the false button press event from being processed by blocking the false button press event from being forwarded to the host OS 320.

In certain cases where the touchpad buttons 306 are not configured underneath the touchpad 304, such as those cases in which the touchpad buttons 306 are configured on the housing of the portable computing device as physical buttons that can be pressed independently of any interaction with the touchpad 304, a user may perform a valid, non-false, button press event when they, shortly following movement of a finger along the touchpad 304, press one of the touchpad buttons 306. To handle this valid button press scenario, the touchpad controller 308 may be configured to provide a time window following the conclusion of touchpad data in which a button press event would still be considered valid. The time window may be any value in which a user would normally lift their finger from the touchpad 304 to press one of the externally configured touchpad buttons 306. For example, the touchpad controller 308 may be configured to, following the conclusion of receipt of touchpad data, wait approximately 300-400 milliseconds before determining that a button press event is invalid. That is, the touchpad controller 308 may within a certain time window following conclusion of receipt of touchpad data, allow the button press event to be processed by the host OS 320.

Figure 4:
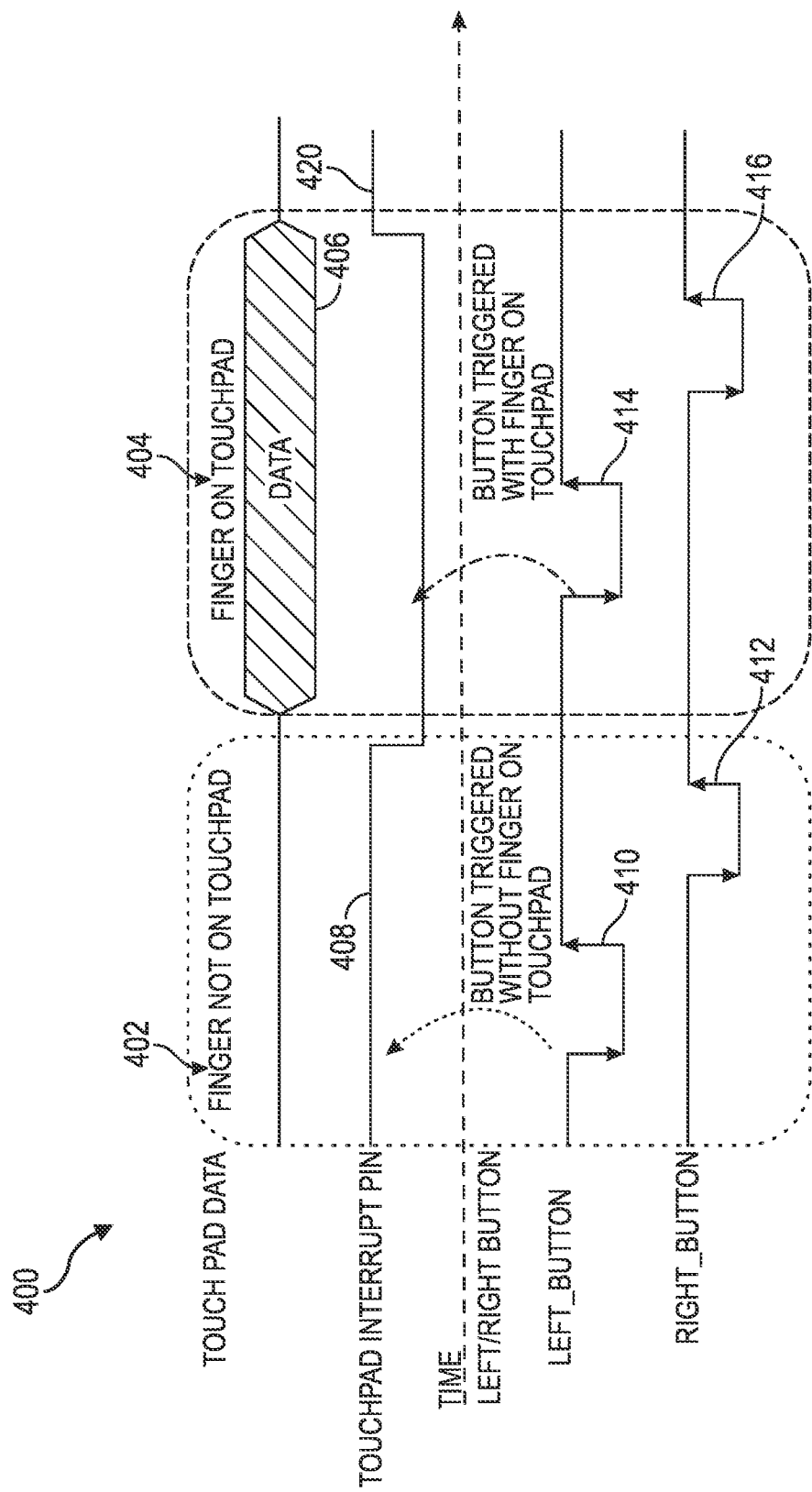
FIG. 4 illustrates an example timeline showing how the false touchpad button event mitigation system may inhibit false button press events from being processed by an IHS according to one embodiment of the present disclosure.

FIG. 4 illustrates an example timeline 400 showing how the false touchpad button event mitigation system 300 may inhibit false button press events from being processed by an IHS according to one embodiment of the present disclosure. The timeline 400 includes a first time region 402 when the finger of the user is not on the touchpad 304, and a second time region 404 when the finger of the user is on the touchpad 304.

During the first time region 402, no touchpad data is being received by the touchpad controller 308. As such, the touchpad controller 308 may activate a touchpad interrupt pin signal 408 at a logic high. Thus, when a left button press event 410 is generated by a left touchpad button 306, the touchpad interrupt pin signal 408 inhibits the left button press event 410 from being forwarded to the host OS 320, since the touchpad is not detecting inputs and the button press event is thus a result of flexure. Similarly, when a right button press event 412 is generated by a right touchpad button 306, the touchpad interrupt pin signal 408 inhibits the right button press event 412 from being forwarded to the host OS 320.

During the second time region 404, touchpad data is being received by the touchpad controller 308 indicating that a finger of the user is in contact with the touchpad 304. In such a case, the touchpad controller 308 may deactivate the touchpad interrupt pin signal 408 to be a logic low. Thus, when a left button press event 414 is generated by the left touchpad button 306, the touchpad interrupt pin signal 408, due to its logic low level, embodiments allow the left button press event 414 to be forwarded to the host OS 320. Similarly, when a right button press event 416 is generated by a right touchpad button 306, the touchpad interrupt pin signal 408 allows the right button press event 416 to be forwarded to the host OS 320.

For cases described above in which the touchpad buttons 306 are configured externally relative to the touchpad 304 (e.g., touchpad buttons 306 are configured as physical buttons that can be pressed independently of any interaction with the touchpad 304), the touchpad controller 308 may wait a specified period of time 420 before asserting the touchpad interrupt pin signal 408 so that the user may have sufficient time to move their finger from the touchpad 304 to the touchpad button 306.

Figure 5:
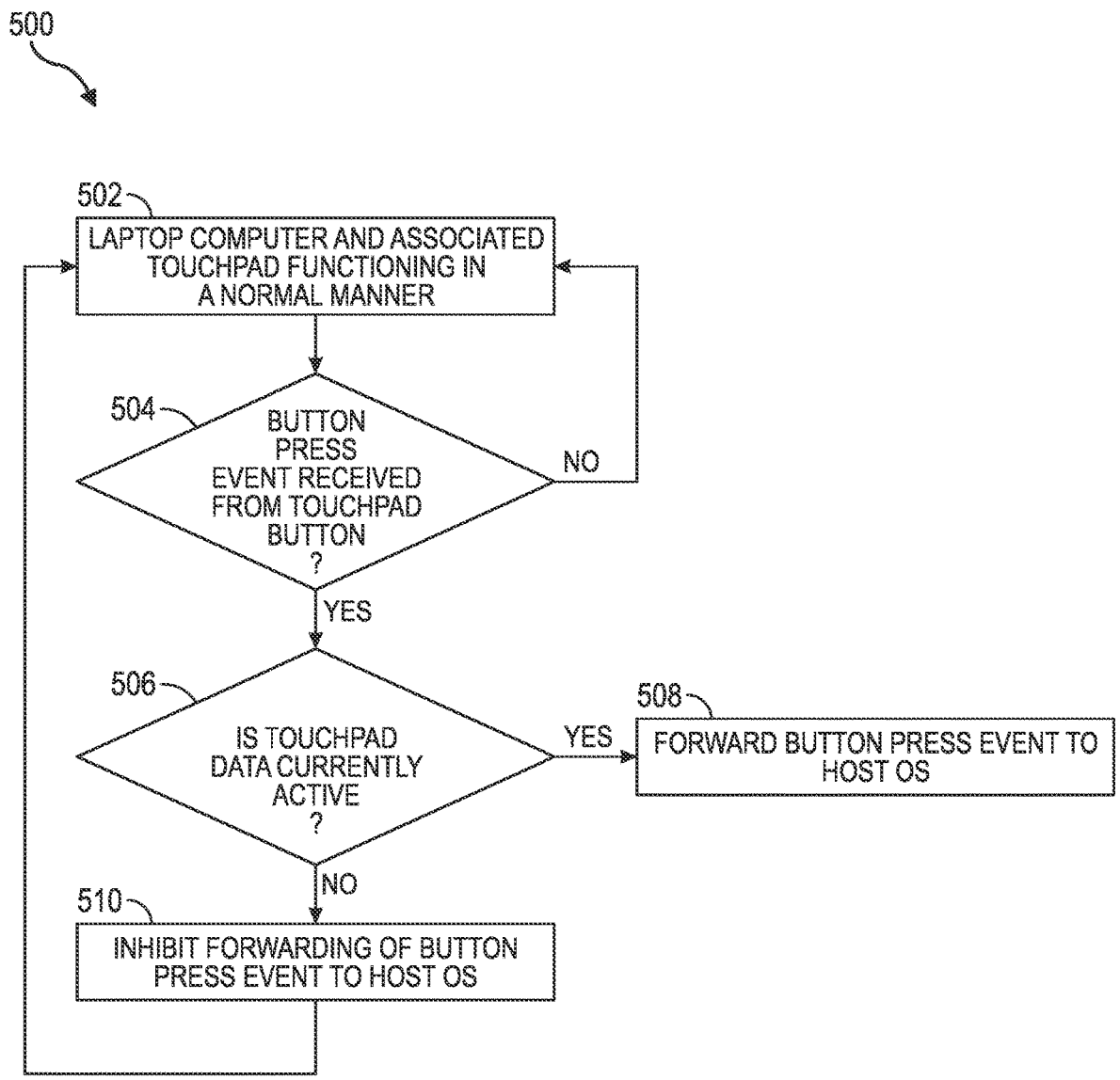
FIG. 5 illustrates an example false touchpad button event mitigation method that may be performed by the false touchpad button event mitigation system to prevent false touchpad button triggering according to one embodiment of the present disclosure.

FIG. 5 illustrates an example false touchpad button event mitigation method 500 that may be performed by the false touchpad button event mitigation system 300 to prevent false touchpad button triggering according to one embodiment of the present disclosure. Additionally or alternatively, the false touchpad button event mitigation method 500 may be performed in whole or in part, by the touchpad controller 308 as described above with reference to FIG. 3. In one embodiment, the false touchpad button event mitigation method 500 may be performed continually as the laptop computer 100 in which it is configured is being used. That is, the false touchpad button event mitigation method 500 may be performed each time a button press event is received from one of the touchpad buttons 306 of the touchpad 304.

Initially at step 502, the laptop computer 100 and its associated touchpad 304 function in a normal manner. That is, the laptop computer 100 may have completed a boot process and is responding normally to input commands from one or more user interface devices (e.g., keyboard, touchpad, etc.) configured on the laptop computer 100. Thereafter at step 504, the false touchpad button event mitigation method 500 determines whether a button press event is received from touchpad button. If not, processing reverts back to step 502 in which the laptop computer 100 operates in a normal manner; otherwise, processing continues at step 506.

At step 506, the false touchpad button event mitigation method 500 determines whether touchpad data 406 is active. If so, processing continues at step 508 in which the button press event data is forwarded to the host OS 320. For example, the touchpad controller 308 may, upon receipt of touchpad data, deactivate a touchpad interrupt pin (e.g., set to a logic low) so that the button press event is forwarded to the host OS 320. If, however, no touchpad data 406 is active, the false touchpad button event mitigation method 500 may inhibit forwarding of the button press event to the host OS 320 at step 510. For example, the touchpad controller 308 may, whenever no touchpad data is currently being received, activate a touchpad interrupt pin (e.g., go to logic high) so that the button press event is inhibited from being forwarded to the host OS 320.

In certain cases where the touchpad buttons 306 are configured externally to the touchpad 306, the false touchpad button event mitigation method 500 may wait a specified amount of time following the conclusion of receipt of touchpad data to assert the touchpad interrupt pin signal. Thus, the user may be provided with a certain specified amount of time to move their finger from the touchpad 304 to a touchpad button 306 and have its associated button press event be considered valid.

In some embodiments, other intervals associated with detected button press events and touchpad data may be utilized in evaluating the validity of a button press event. For instance, the timing between repeated detected button press events may provide indications of the validity of button press events. In some embodiments, the detection of repeated button press events in close proximity to each other may indicate the button press events are not intentional by a user, such that the touchpad controller may inhibit processing of the button press event. In some embodiments, the detection of a button press event that is of a very short duration (e.g., less than 25 milliseconds) may indicate the button press event is due to flexure or is otherwise not intentional by a user, such that the touchpad controller may inhibit processing of the button press event. In some embodiments, the detection of conflicting, overlapping or close-proximity button press events from different buttons may indicate the button press event is due to flexure or is otherwise not intentional by a user, such that the touchpad controller may inhibit processing of the button press event. For instance, the detection of a left button press event that is simultaneous or overlapping with a right button press event may provide indication of both of the button press events being invalid. In another example, the detection of two button press events from different buttons within a certain time interval (i.e., 100 milliseconds or less) may indicate the button press events are not intentional, whereas the detection of two button press events from the same button are detected within a shorter time interval (i.e., 50 milliseconds or less) may provide an indication of the events being unintentional. In this manner, the touchpad controller may rely on button timing information to determine whether to inhibit button press event, where such reliance may be used to augment inconclusive touchpad data.

The false touchpad button event mitigation method 500 described above may be performed continually as the laptop computer 100 is used in the normal manner. Nevertheless, when use of the false touchpad button event mitigation method 500 is no longer needed or desired, the method 500 ends.

Although FIG. 5 describes an example method 500 that may be performed to prevent false touchpad button triggering, the features of the method 500 may be embodied in other specific forms without deviating from the spirit and scope of the present disclosure. For example, the method 500 may perform additional, fewer, or different operations than those described in the present examples. For another example, the method 500 may be performed in a sequence of steps different from that described above. As yet another example, certain steps of the method 500 may be performed by other components in the laptop computer 100 other than those described above.

Figure 6:
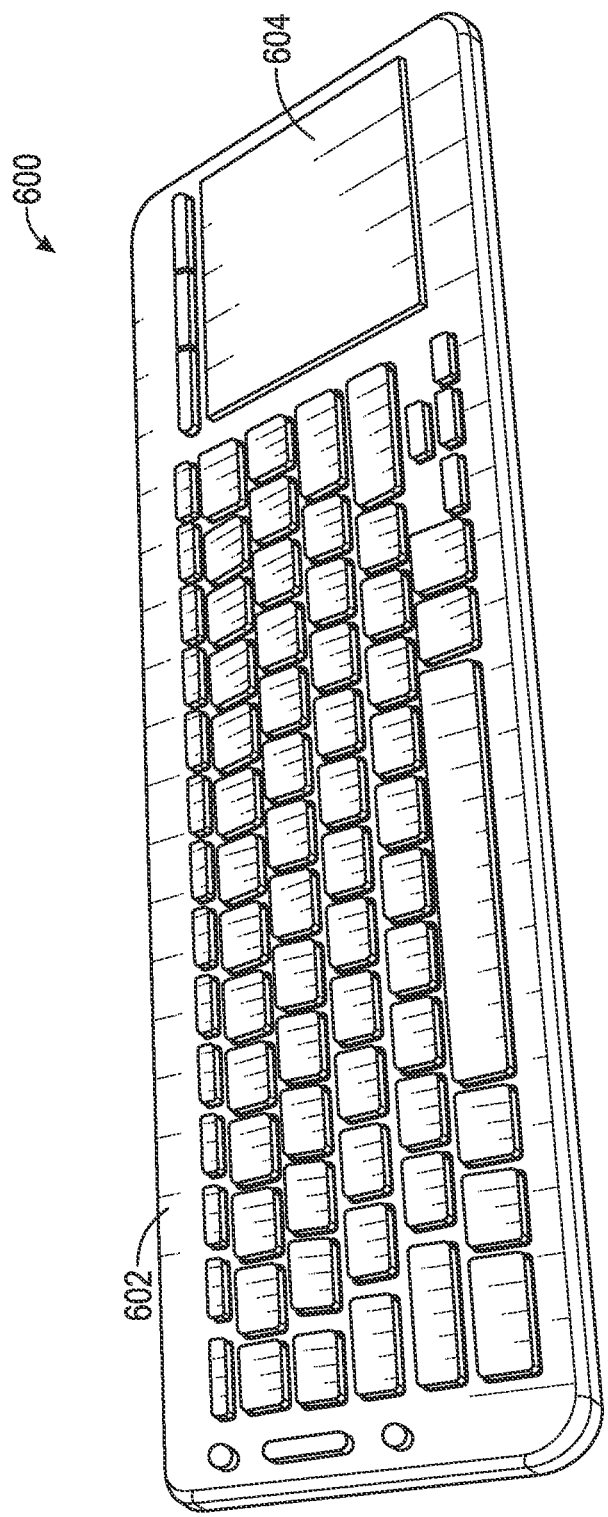
FIG. 6 illustrates an example keyboard assembly that may utilize the false touchpad button event mitigation system and method according to one embodiment of the present disclosure.

FIG. 6 illustrates an example keyboard assembly 600 that may utilize the false touchpad button event mitigation system and method according to one embodiment of the present disclosure. The keyboard assembly 600 includes a keyboard 602 comprising an arrangement of keys (e.g., buttons) and a touchpad 604, such as touchpad 304 described above with reference to FIG. 3 described herein above. The keyboard assembly 600 may communicate with an IHS 200 in any suitable manner. In one embodiment, the keyboard assembly 600 is a wireless peripheral input device that uses a wireless protocol, such as Bluetooth, to communicate with the IHS 200. In other embodiments, the keyboard assembly 600 may be a wired peripheral input device that is coupled to the IHS 200 via a USB port. It is contemplated that the false touchpad button event mitigation system and method may be implemented with any peripheral input device that includes a touchpad.

Embodiments of the present disclosure may provide certain advantages when applied to touchpads configured on keyboard assemblies, such as keyboard assembly 600. For example, certain keyboard assemblies may experience similar problems as described above due to the flexibility of their housings, which can flex due to abnormal stresses placed upon them. Additionally, incorporating the false touchpad button event mitigation system and method on peripheral input devices, such as keyboard assembly 600 may provide additional reliability to the touchpad so that the structure can be made even lighter for enhanced user experience.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
   a touchpad configured to generate touchpad data for manipulating the operation of the IHS that comprises a housing that is susceptible to causing a false button press event due to flexure of the housing;
   one or more buttons located beneath associated with the touchpad; and
   at least one memory coupled to at least one processor, the at least one memory having program instructions stored thereon that, upon execution by the at least one processor, cause the instructions to:
      detect a button press event reported by one of the buttons located beneath the touchpad;
      in response to the detected button press event, determine whether the touchpad is reporting data indicative of a finger in contact with the touchpad; and
      when the touchpad is not reporting data indicative of a finger in contact with the touchpad, inhibit the button press event from being processed by the IHS on the basis of the button press event being a false button press event.

2. The IHS of claim 1, wherein the program instructions, upon execution, further cause the IHS to, when the touchpad is reporting data indicative of a finger in contact with the touchpad, allow the button press event to be processed by the IHS.

3. The IHS of claim 1, wherein the buttons comprise a left button located under a left portion of the touchpad and a right button located under a right portion of the touchpad.

4. The IHS of claim 1, wherein the buttons comprise mechanical buttons.

5. The IHS of claim 1, wherein the program instructions are performed on a discrete integrated circuit (IC) component.

6. The IHS of claim 4, wherein the program instructions, upon execution, further cause the IHS to communicate with the touchpad using an I2C protocol.

7. The IHS of claim 1, wherein the program instructions, upon execution, further cause the IHS to, following conclusion of the touchpad data, wait a specified amount of time prior to inhibiting the button press event from being processed by the IHS.

8. The IHS of claim 7, wherein the buttons are configured external to the touchpad.

9. A false touchpad button event mitigation method comprising:
   implementing an Information Handling System (IHS) comprising a housing that is susceptible to causing a false button press event of one or more buttons located beneath a touchpad of the IHS, where the false button press event is due to flexure of the housing;

detecting a button press event reported by one of the buttons located beneath the touchpad;

in response to the detected button press event, determining whether the touchpad is reporting data indicative of a finger in contact with the touchpad; and when the touchpad is not reporting data indicative of a finger in contact with the touchpad, inhibiting the button press event from being processed by the IHS on the basis of the button press event being a false button press event.

10. The false touchpad button event mitigation method of claim 9, further comprising, when the touchpad is reporting data indicative of a finger in contact with the touchpad, allowing the button press event to be processed by the IHS.

11. The false touchpad button event mitigation method of claim 9, wherein the buttons comprise mechanical buttons.

12. The false touchpad button event mitigation method of claim 9, wherein the inhibiting of the button press event from being processed is performed on a discrete integrated circuit (IC) component of the IHS.

13. The false touchpad button event mitigation method of claim 9, further comprising communicating with the touchpad using an I2C protocol.

14. The false touchpad button event mitigation method of claim 9, further comprising, following conclusion of receipt of the touchpad data, wait a specified amount of time prior to inhibiting the button press event from being processed by the IHS, wherein the button is configured external to the touchpad.

15. A portable computing device comprising:

a touchpad configured to generate touchpad data for manipulating the operation of the portable computing device, wherein the portable computing device comprises a housing that is susceptible to causing a false button press event of one or more buttons located beneath the touchpad, where the false button press event is due to flexure of the housing;

the one or more buttons located beneath the touchpad; and at least one memory coupled to at least one processor, the at least one memory having program instructions stored thereon that, upon execution by the at least one processor, cause the instructions to:

detect a button press event reported by one of the buttons located beneath the touchpad;

in response to the detected button press event, determine whether the touchpad is reporting data indicative of a finger in contact with the touchpad;

when the touchpad is not reporting data indicative of a finger in contact with the touchpad, inhibit the button press event from being processed by the portable computing device; and when the touchpad is reporting data indicative of a finger in contact with the touchpad, allow the button press event to be processed by the portable computing device.

16. The portable computing device of claim 15, wherein the touchpad is configured in a peripheral input device.

17. The IHS of claim 5, wherein the discrete integrated circuit (IC) component generates an interrupt signal when the touchpad is not reporting data indicative of a finger in contact with the touchpad.

18. The IHS of claim 17, wherein the interrupt signal inhibits button press events from being processed by the IHS.

19. The false touchpad button event mitigation method of claim 12, wherein the discrete integrated circuit (IC) component generates an interrupt signal when the touchpad is not reporting data indicative of a finger in contact with the touchpad, and wherein the interrupt signal inhibits button press events from being processed by the IHS.

20. The portable computing device of claim 15, wherein a touchpad controller generates an interrupt signal when the touchpad is not reporting data indicative of a finger in contact with the touchpad, and wherein the interrupt signal inhibits button press events from being processed by the IHS.

* * * * *

UNITED STATES PATENT AND TRADEMARK OFFICE
CERTIFICATE OF CORRECTION

PATENT NO. : 12,405,691 B2
APPLICATION NO. : 18/314236
DATED : September 2, 2025
INVENTOR(S) : Tao-Peng Chu et al.

Page 1 of 1

It is certified that error appears in the above-identified patent and that said Letters Patent is hereby corrected as shown below:

On the Title Page

ABSTRACT (57):
Delete "Embodiments of the present disclosure provide systems and methods to prevent false triggering of the touchpad buttons associated with a touchpad. The false touchpad button mitigation system and method uses executable logic that upon detection of a button press event, determines whether touchpad data is currently being received from the touchpad, and when no touchpad data is currently being received, inhibit the button press event from being processed by an Information Handling System (HIS). Touchpad data refers to data generated by a touchpad when a user's finger is touching the touchpad. Thus, if the user is not actively touching the touchpad, the false button press event may be blocked by the executable logic." and insert -- Embodiments of the present disclosure provide systems and methods to prevent false triggering of the touchpad buttons associated with a touchpad. The false touchpad button mitigation system and method uses executable logic that upon detection of a button press event, determines whether touchpad data is currently being received from the touchpad, and when no touchpad data is currently being received, inhibit the button press event from being processed by an Information Handling System (IHS). Touchpad data refers to data generated by a touchpad when a user's finger is touching the touchpad. Thus, if the user is not actively touching the touchpad, the false button press event may be blocked by the executable logic. -- therefor.

In the Claims

In Column 12, Line 25, Claim 1, delete "one or more buttons located beneath associated with the" and insert -- one or more buttons located beneath the -- therefor.

Signed and Sealed this
Fourteenth Day of October, 2025

John A. Squires
*Director of the United States Patent and Trademark Office*